US009883157B2

(12) United States Patent
Wang et al.

(10) Patent No.: US 9,883,157 B2
(45) Date of Patent: Jan. 30, 2018

(54) DATA ACCESS CONTROL METHOD AND APPARATUS

(71) Applicant: MStar Semiconductor, Inc., Hsinchu Hsien (TW)

(72) Inventors: Te-Chuan Wang, Hsinchu Hsien (TW); Tsung-Hsiu Ko, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 101 days.

(21) Appl. No.: 14/177,341

(22) Filed: Feb. 11, 2014

(65) Prior Publication Data

US 2014/0254999 A1 Sep. 11, 2014

(30) Foreign Application Priority Data

Mar. 6, 2013 (TW) .............................. 102107896 A

(51) Int. Cl.
| | |
|---|---|
| *H04N 5/935* | (2006.01) |
| *H04N 3/24* | (2006.01) |
| *H04N 7/12* | (2006.01) |
| *H04N 9/88* | (2006.01) |
| *H04N 9/87* | (2006.01) |
| *H04N 21/236* | (2011.01) |
| *H04N 21/418* | (2011.01) |

(52) U.S. Cl.
CPC .............. *H04N 9/87* (2013.01); *H04N 5/935* (2013.01); *H04N 21/23611* (2013.01); *H04N 21/4181* (2013.01); *H04N 3/24* (2013.01); *H04N 7/12* (2013.01)

(58) Field of Classification Search
CPC ......... H04N 21/23611; H04N 21/4181; H04N 9/87; H04N 11/02

USPC ............... 386/203, 264; 370/428, 474, 487; 375/240.24, 240.25, 240.01; 708/622; 712/221

See application file for complete search history.

(56) References Cited

U.S. PATENT DOCUMENTS

| | | | | |
|---|---|---|---|---|
| 5,724,475 A | * | 3/1998 | Kirsten ............ | G08B 13/19645 348/E7.086 |
| 5,907,660 A | * | 5/1999 | Inoue ...................... | H04N 5/783 375/E7.273 |
| 5,936,872 A | * | 8/1999 | Fischer ................. | G06F 7/4812 708/622 |

(Continued)

FOREIGN PATENT DOCUMENTS

TW I246862 B 1/2006

*Primary Examiner* — Thai Tran
*Assistant Examiner* — Syed Hasan
(74) *Attorney, Agent, or Firm* — Edell, Shapiro & Finnan, LLC

(57) ABSTRACT

One embodiment of the present invention discloses a data access method comprising: (a) receiving a plurality of data units consisting of filtered data units and un-filtered data units; (b) filtering the filtered data units; (c) storing the un-filtered data units; (d) recovering the timings of the un-filtered data units stored in the step (c) according to the received timings of the data units received in the step (a); (e) inserting replacement data units to replace the filtered data units, wherein each of the replacement data units has the same timing as each of the filtered data units; and (f) outputting the un-filtered data units and the replacement data units according to the timings of the un-filtered data units and the timing of the replacement data unit.

12 Claims, 7 Drawing Sheets

(56) References Cited

U.S. PATENT DOCUMENTS

| | | | | |
|---|---|---|---|---|
| 8,750,315 B2* | 6/2014 | Dandekar | ............ | H04L 65/602 |
| | | | | 370/395.61 |
| 2006/0104363 A1* | 5/2006 | Chang | ................. | H04N 19/428 |
| | | | | 375/240.24 |
| 2010/0172402 A1* | 7/2010 | Devictor | ................ | H04H 60/80 |
| | | | | 375/240.01 |
| 2010/0189122 A1 | 7/2010 | Dandekar et al. | | |

* cited by examiner

DATA ACCESS CONTROL METHOD AND APPARATUS

CROSS REFERENCE TO RELATED APPLICATIONS

This application claims priority under 35 U.S.C. 119 to Taiwan patent application, TW102107896, filed on Mar. 6, 2013, the disclosure of which is incorporated herein by reference.

BACKGROUND OF THE INVENTION

1. Field of the Invention

The present invention relates to data access control method and apparatus, and more particularly, to data access control method for inserting null packet to increase fluency of media play and corresponding data access control module.

2. Description of the Prior Art

PCMCIA (personal computer memory card international association) cards may be used to decode image. For example, after paying fee to digital television (TV) operator, PCMCIA card equipped with decoder chip would be provided to subscriber. Alternatively, decoder program or serial number would be provided if subscriber already owns PCMCIA card. As a result, TV data encoded by operator could be decoded and played by PCMCIA card.

The classic decoding flow of PCMCIA card could be categorized into two kinds. First, the decoded TV data stream is stored and encrypted again by another encryption method. Once user wants to play, the stored and encrypted TV data stream would be decrypted and played. In this example, the locally encrypted TV data stream is stored in a storage device other than PCMCIA card. It is possible to retrieve the encrypted TV data stream from the separate storage device illegally and to decrypt the encrypted TV data stream illegally. In such architecture, the protection to TV data stream is not very well. In alternative architecture, the encrypted TV data stream is stored without being decrypted. Once user wants to play, the stored encoded TV data stream is sent to PCMCIA card for decoding and play. Since operator is required to provide PCMCIA card or associated information for decoding the TV data stream in the second scenario, the protective strength is stronger than the first one.

Please refer to FIG. 1, which is a block diagram of a digital TV device 100 equipped with PCMCIA card in the prior art. The digital TV device 100 adopted the fore mentioned second mechanism, i.e., the encoded TV data stream is stored without being decoded, is sent to PCMCIA card for decryption, and then is played. As shown in the FIG. 1, the digital TV device 100 comprises an antenna 101, a tuner 103, a demodulator 105, a data access control device 107, and a PCMCIA card 109. The antenna 101 is configured to receive TV data signal comprising signal encoded by the operator. The tuner 103 is configured to tune the frequency to a specified channel. The demodulator 105 receives TV data signal from the tuner 103, demodulates the input signal and performs channel calibration, synchronization, forward error connection, and etc. Because the tuner 103 and the demodulator 105 in the digital TV device 100 are well-known to ordinary skilled in the art, the present invention has no further discussions on them. The original TV data (SD) such as MPEG (Motion Picture Experts Group) transport stream processed by the tuner 103 and the demodulator 105 is transmitted to the data access control device 107. As mentioned above, the original TV data (SD) is stored in the data access control device 107. Once the data access control device 107 receives an output command, the stored original TV data SD' is outputted to the PCMCIA card 109 for decoding and the decoded TV data CD is generated accordingly. The decoded TV data CD may be sent directly to display or manipulated by some sorts of image processing such as image timing calibration or image contrast enhancement.

A timing alignment mechanism exists in original TV data packets. However, the alignment mechanism fails to function properly because the packets are stored in the storage device. In the architecture discussed above, since the original TV data SD is stored and sent to PCMCIA card 109 for decoding and play, the alignment mechanism of packets is broken. Hence, when user watches the stored original TV data SD', the fluency, smoothness, and quality of image is not comparable with real time TV data.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

One of the objectives of the present invention is to provide data access control method and apparatus for recovering timings of stored TV data and patching null packets according to the timings such that playing stored TV program is as fluency, smooth, and qualitative as to playing real-time TV program One embodiment of the present invention discloses a data access method comprising: (a) receiving a plurality of data units consisting of filtered data units and un-filtered data units; (b) filtering the filtered data units; (c) storing the un-filtered data units; (d) recovering the timings of the un-filtered data units stored in the step (c) according to the received timings of the data units received in the step (a); (e) inserting replacement data units to replace the filtered data units, wherein each of the replacement data units has the same timing as each of the filtered data units; and (f) outputting the un-filtered data units and the replacement data units according to the timings of the un-filtered data units and the timing of the replacement data unit.

Another embodiment of the present invention discloses a data access apparatus which comprises a filter configured to receive a plurality of data units consisting of filtered data units and un-filtered data units and to filter the filtered data units; a timing record unit configured to generate the timings of the data units outputted by the filter according to the received timings of the plurality of data units; a storage unit configured to store the un-filtered data units; a timing recovery unit configured to recover the timings of the un-filtered data units stored in the storage unit according to the timings recorded by the timing record unit; a replacement data unit insertion unit configured to insert replacement data units to replace the filtered data units, wherein each of the replacement data units has the same timing as each of the filtered data units; and an output controller configured to output the un-filtered data units and the replacement data unit according to the timings of the filtered data units and the timing of the replacement data unit, respectively.

As discussions in the fore-mentioned embodiments, by patching null packets, the TV data can be outputted according to original timings. Therefore user experience of watching stored TV data is as the same fluency, smooth, and quality as watching real-time TV program. By adjusting the outputting data rate, user gets better experiences of fluency and smooth media play and image quality.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
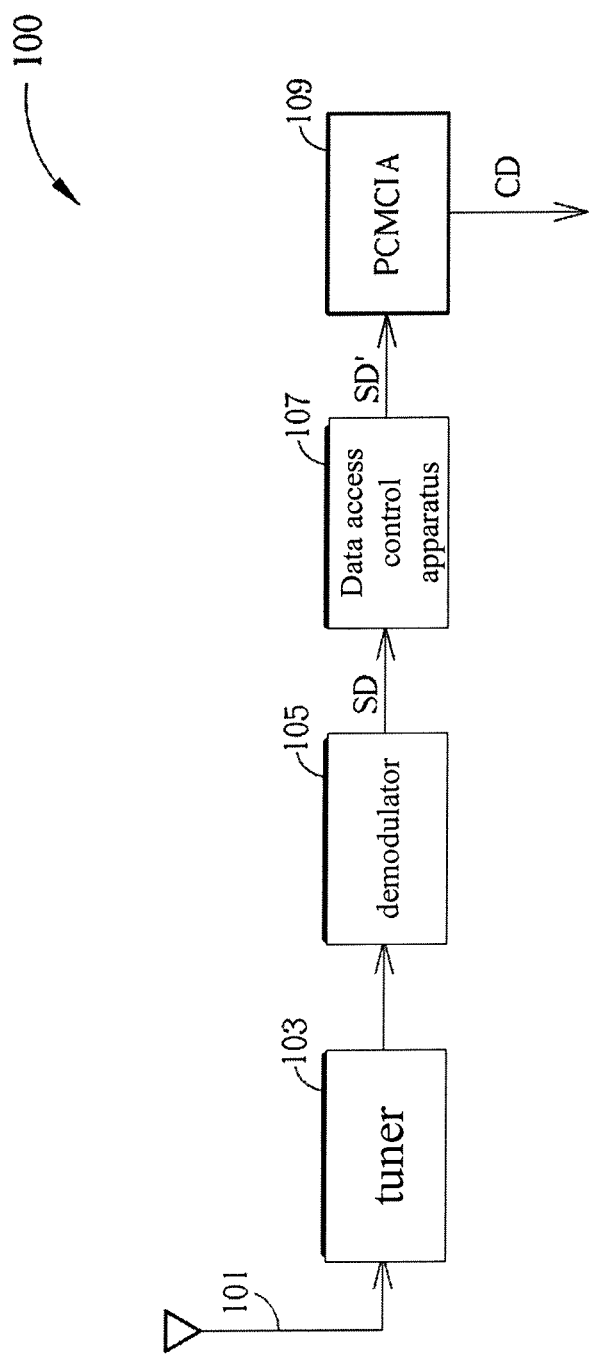
FIG. 1 illustrates a block diagram of a digital TV device equipped with PCMCIA card in the prior art.
Figure 2:
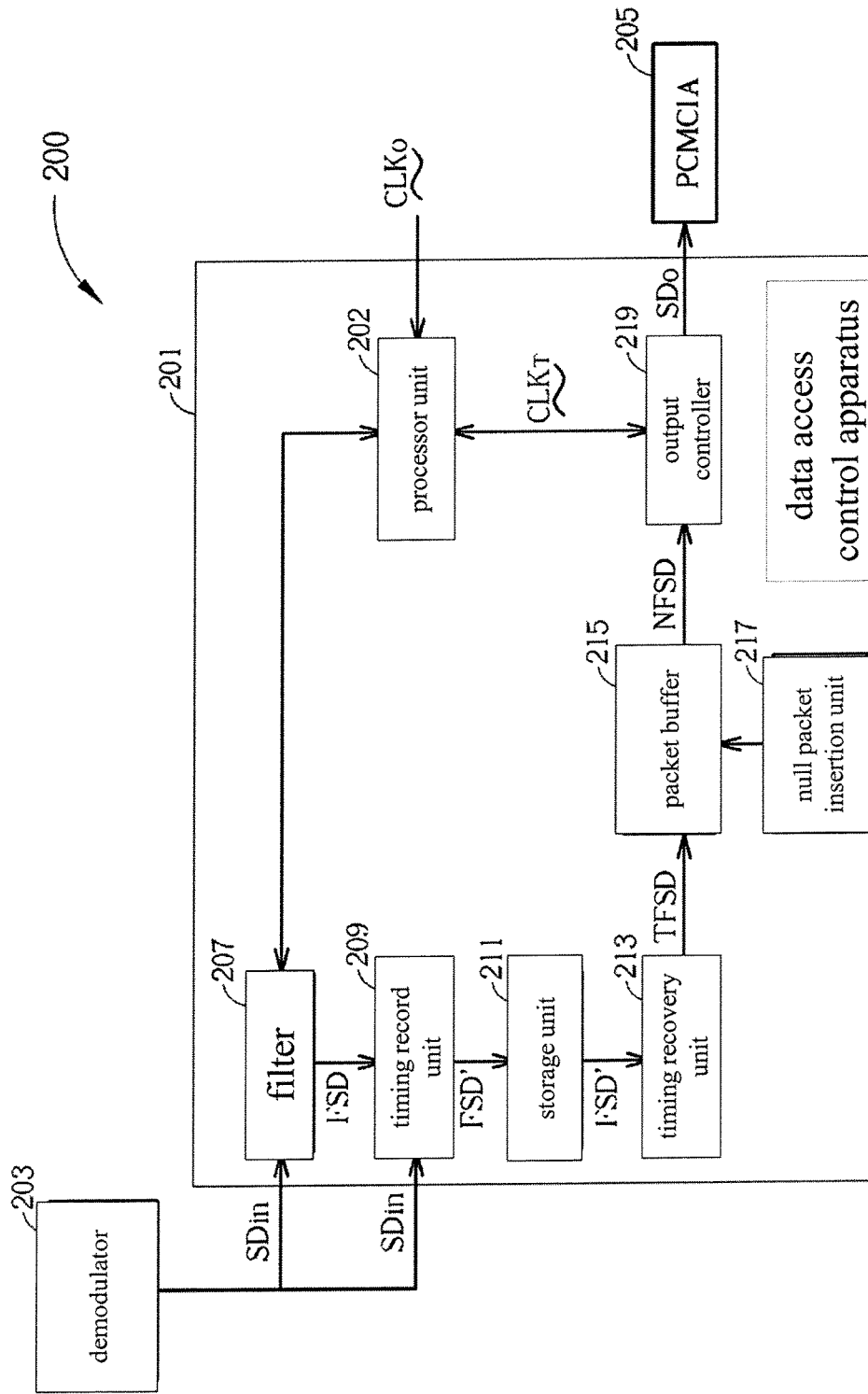
FIG. 2 illustrates a block diagram of data access control module in accordance with an embodiment of the present invention.
Figure 3:
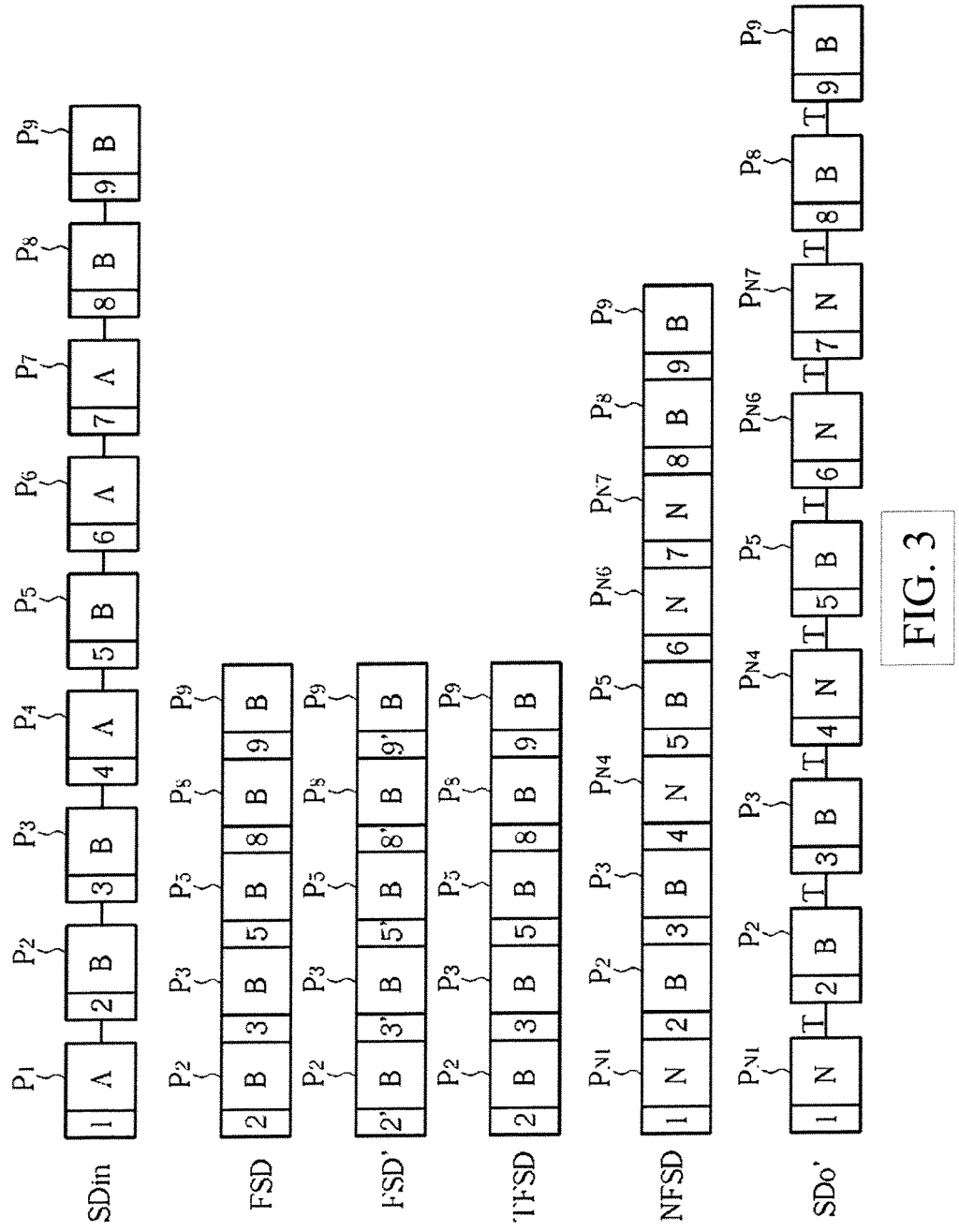
FIG. 3 shows a timing diagram performed by the data access control module shown in the FIG. 2.

Please refer to FIG. 2, which illustrates a block diagram of data access control module 201 in accordance with an embodiment of the present invention. In this embodiment, a digital TV 200 is still used as example. Data access control module 201 receives original TV data $SD_{in}$ from the tuner 203 and outputs stored TV data $SD_o$ to PCMCIA card 205. Please be aware that the present invention is not limited to digital TV signal, any other kinds of data may be applicable. In response to a user command (for example, a record instruction sent to the data access control module 201), the original TV data $SD_{in}$ may be stored according to the user command. Alternatively, the data access control module 201 may automatically store the original TV data $SD_{in}$ for buffering or backup. FIG. 3 shows a timing diagram performed by the data access control module 201 shown in the FIG. 2. Please crossly refer to FIG. 2 and FIG. 3 for better understanding the present invention.

As shown in the FIG. 2, the data access control module 201 comprises a processing unit 202, a filter 207, a timing record unit 209, a storage unit 211, a timing recovery unit 213, a packet buffer 215, a null packet insertion unit 217, and an output controller 219. In this embodiment, the processing unit 202 is used to control all components (some control lines are not illustrated). In alternative embodiments, different components may be controlled by different control logic circuits respectively. The filter 207 is configured to receive original TV data $SD_{in}$ from the tuner 203. The original TV data $SD_{in}$ comprises a plurality of packets $P_1$ to $P_9$ as shown in the FIG. 3. The filter 207 filters out at least one packet of the original TV data $SD_{in}$ and outputs the rest packets as filtered TV data FSD. In one embodiment, the filter 207 is a PID (Package Identification) filter which filters out unnecessary TV data according to preset parameters. For example, the packets $P_1$, $P_4$, $P_6$, and $P_7$ belong to TV data of program A and the rest packets $P_2$, $P_3$, $P_5$, $P_8$, and $P_9$ belong to TV data of program B which is a pay TV program must be decoded by PCMCIA card 205. In this instance, user wants to watch the pay TV program. Therefore the filter 207 only allows TV data of program B passing through. As a result, the filtered TV data FSD comprises the left packets $P_2$, $P_3$, $P_5$, $P_8$, and $P_9$.

As discussed above, there is a timing alignment mechanism in original TV data packets. However, the alignment mechanism is fail after the packets are stored in the storage unit. Please refer to FIG. 3, the packets $P_1$ to $P_9$ of the original TV data SD are corresponding to timings 1 to 9, respectively. After the filtered TV data FSD is stored in the storage unit 211, relationship between timings are broken. Hence, there exists a need for a mechanism to recover the timings of the stored packets. In one embodiment, a timing record unit 209 and a timing recovery unit 213 are provided to recover the mechanism. The timing record unit 209 is configured to record timings of the filtered TV data FSD outputted from the filter 207. Accordingly, the timing recovery unit 213 is configured to recover the timings of the filtered TV data FSD according to the recorded timings such that filtered TV data with timing data TFSD is generated as a result. In one embodiment, the timing record unit 209 is configured to provide temporary timings to packets of the filtered TV data FSD in order to generate temporary filtered TV data FSD' according to the times when the packets received by the tuner 203. As shown in the FIG. 3, the temporary filtered TV data FSD' comprises temporary timings 2', 3', 5', 8' and 9'. In consequence, the timing recovery unit 213 recovers the timing of packets and generates the filtered TV data with timing data TFSD according to the temporary filtered TV data FSD'. The timing record unit 209 and timing recovery unit 213 could be constructed in various circuit architectures. For example, Taiwan patent application TW201105137 discloses applicable architectures and operating methods. More specifically, the video recorder 2A shown in the FIG. 2 of the Taiwan patent application has equivalent functions of the timing record unit 209 of the present invention. And the video player 2B of the Taiwan patent application has equivalent functions of the timing recovery unit 213 of the present invention. The examples are not used to limit the scope of the present invention. Any logic circuits or means provide equivalent functions of the timing record unit 209 and timing recovery unit 213 falls in the scope of the present invention.

The null packet insertion unit 217 is configured to insert at least one null packet to the at least one filtered-out packets in order to generate filtered TV data with null packets NFSD. Each null packet has the same timing of the corresponding filtered-out packet. For example, in the filtered TV data with null packets NFSD shown in the FIG. 3, null packets $P_{N1}$, $P_{N4}$, $P_{N6}$, and $P_{N7}$ are used to substitute for the filtered-out packets $P_1$, $P_4$, $P_6$, and $P_7$ correspond to the timings 1, 4, 6, and 7, respectively. In one embodiment, the packet buffer 215 comprises a plurality of buffer units for storing packets temporarily. If the processing unit 202 detects that any buffer unit does not receive packet to be received, the null packet insertion unit 217 is instructed to insert a null packet to the buffer unit. The output controller 219 is configured to output the non-filtered out packets and null packets according to the timings of the filtered TV data with null packets NFSD shown as the stored TV data $SD_o$ in the FIG. 3. In one embodiment, when the stored TV data $SD_o$ is outputted, there is a time period T between the packet transmission time points. The existence of time period T may be excused in several ways. It may be caused by time delays of components or may be required by data transmission specification.

Figure 4:
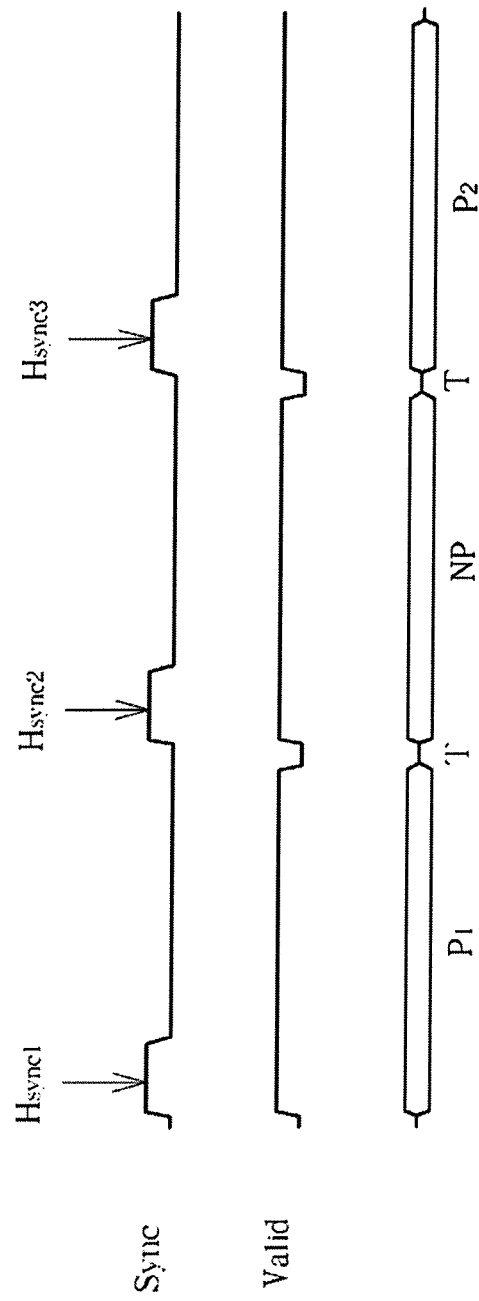
FIG. 4 also illustrates a detailed timing diagram performed by the data access control module shown in the FIG. 2.

Please refer to FIG. 4, which illustrates a detailed timing diagram performed by the data access control module 201 shown in the FIG. 2. FIG. 4 shows relationships between signals, including synchronization signal SYNC and validation signal VALID, and data packets, including TV data packets and null packets. The synchronization signal SYNC indicates a packet is ready to be transmitted. In other words, between two high voltage levels of the synchronization signal SYNC, a complete packet is transmitted. The validation signal VALID indicates if any packet is transmitted. In one embodiment, high voltage level of the validation signal VALID represents a packet is transmitted and low voltage level of the validation signal VALID represents a time period T between two packets. The time period T represents no packet is transmitted. As shown in the FIG. 4, when the synchronization signal SYNC first is raised to high voltage level ($Hsync_1$) first time and the validation signal VALID is also raised to high voltage level, it begins to transmit packet $P_1$. When the validation signal VALID is fallen to low voltage level, it ceases to transmit packet $P_1$ (the transmission may be completed or forcibly interrupted.) Similarly, when the synchronization signal SYNC is raised to high voltage level ($Hsync_2$) second time and the validation signal VALID is also rised to high voltage level, it begins to transmit null packet NP. When the validation signal VALID is fallen to low voltage level, it ceases to transmit packet NP (the transmission may be completed or forcibly interrupted.)

Figure 5:
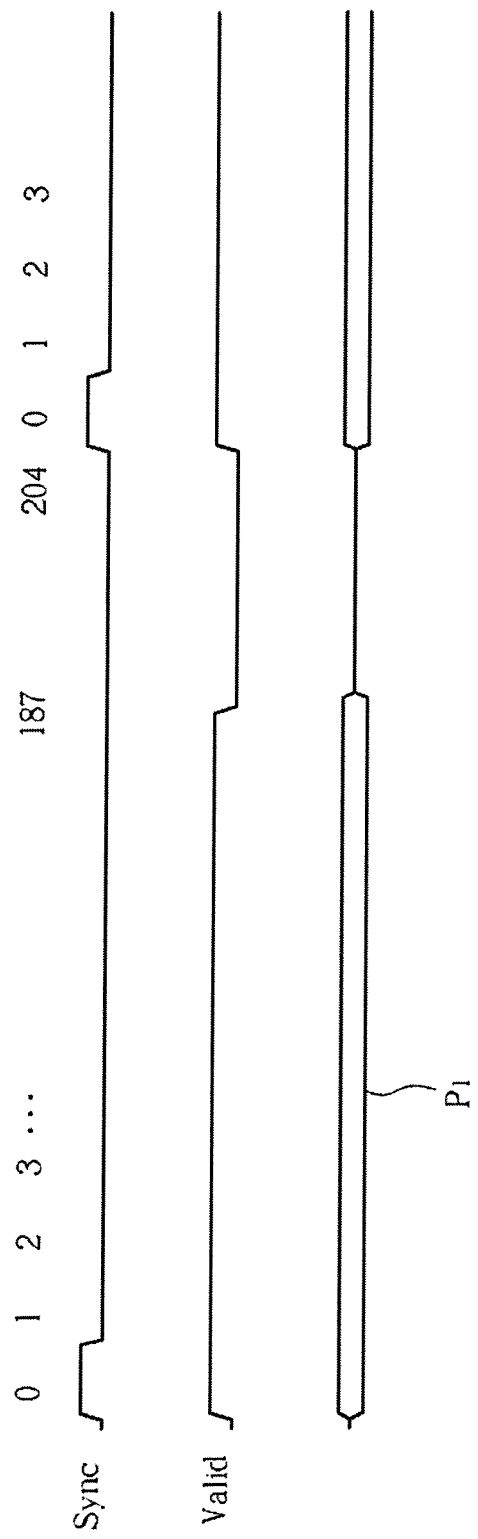
FIG. 5 and FIG. 6 show timing diagrams of the data access control module according to different embodiments in accordance with the present invention.
Figure 6:
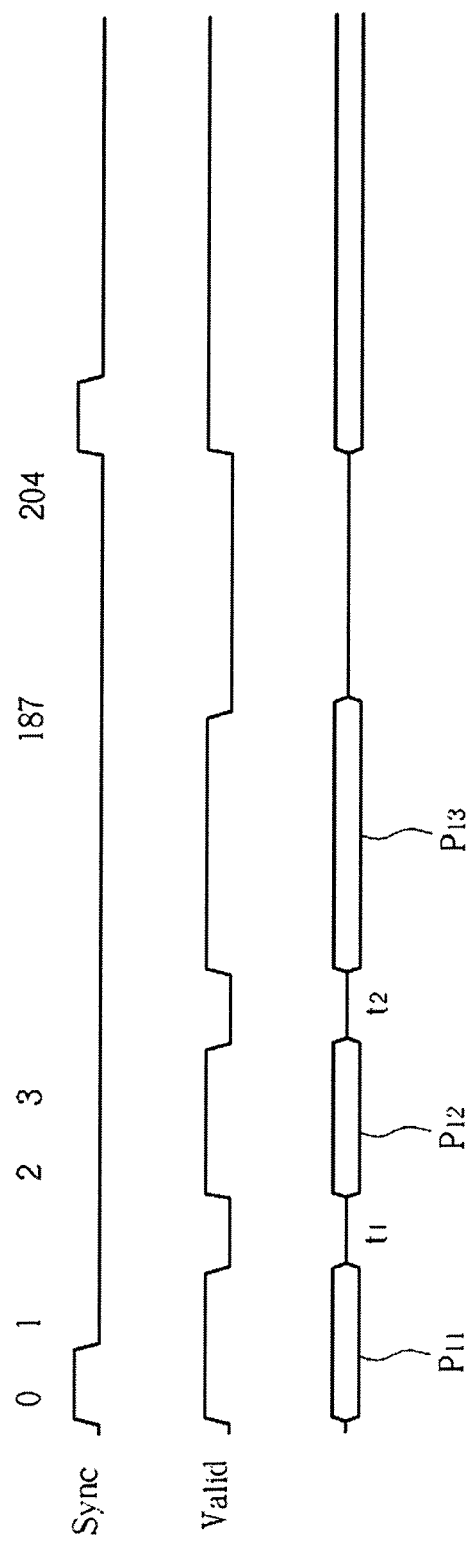

FIG. 5 and FIG. 6 show timing diagrams of the data access control module according to different embodiments in accordance with the present invention. In the embodiment shown in the FIG. 5, the processing unit 202 controls the output controller 219 such that during a predetermined time period (i.e., time period between two high voltage levels of the synchronization signal SYNC) one of the TV data packet and the null packet data is outputted by the output controller 219. And the size of the outputted packet equals to a predetermined value, i.e. 188 bytes. In another embodiment shown in the FIG. 6, the packet $P_1$ can be divided into a plurality of partial packets $P_{11}$, $P_{12}$, and $P_{13}$. Similarly, the packet $P_1$ may be a TV data packet or a null packet. When outputting the partial packets $P_{11}$, $P_{12}$, and $P_{13}$, there are two non-outputting time periods $t_1$ and $t_2$. In this instance, the processor 202 controls the output controller 219 such that during a predetermined time period (i.e., time period between two high voltage levels of the synchronization signal SYNC) the data volume of partial packets and un-outputting time periods equals to a predetermined value. For example, the data volume of the partial packets $P_{11}$, $P_{12}$, and $P_{13}$ equals 188 bytes.

In one embodiment, the predetermined value in the embodiments shown in the FIG. 5 and FIG. 6 equals to data volume received by the filter 207 during one predetermined time period. In such circumstance, the output data volume by the output controller 219 which is in turn controlled by the processor 202 equals to the received data volume of the filter 207 during one predetermined time period. There are many mechanisms to realize the outputs shown in the FIG. 5 and FIG. 6. One of these mechanisms is to provide an output signal $CLK_T$ to the output controller 219 as output timing clock signal. The frequency of the output signal $CLK_T$ is tuned to fit the requirement. In another embodiment, an external timing clock signal $CLK_0$ is provided. The processing unit 202 divides this timing clock signal $CLK_0$ with different ratios to generate multiple coarse-grained divided timing clock signals. Furthermore, the processing unit 202 determines which one of the coarse-grained divided timing clock signals is closest to the required frequency and selects the closest one as the output signal $CLK_T$. The steps described above are coarse-tuned. After that, the time period between packets (as T shown in the FIG. 4) is adjusted as fine tuned. However, please be aware that the present invention does not intend to limit the scope to this mechanism for realizing the outputs shown in the FIG. 5 and FIG. 6.

However, data to be transmitted may not be in the form of packet. The packet is interchangeable to other types of data units. In such circumstance, packet can be viewed as data unit and null packet can be taken as replacement data unit. The packet buffer 215 shown in the FIG. 2 may be a data unit buffer. And the null packet insertion unit 217 may be a replacement data unit insertion unit.

Figure 7:
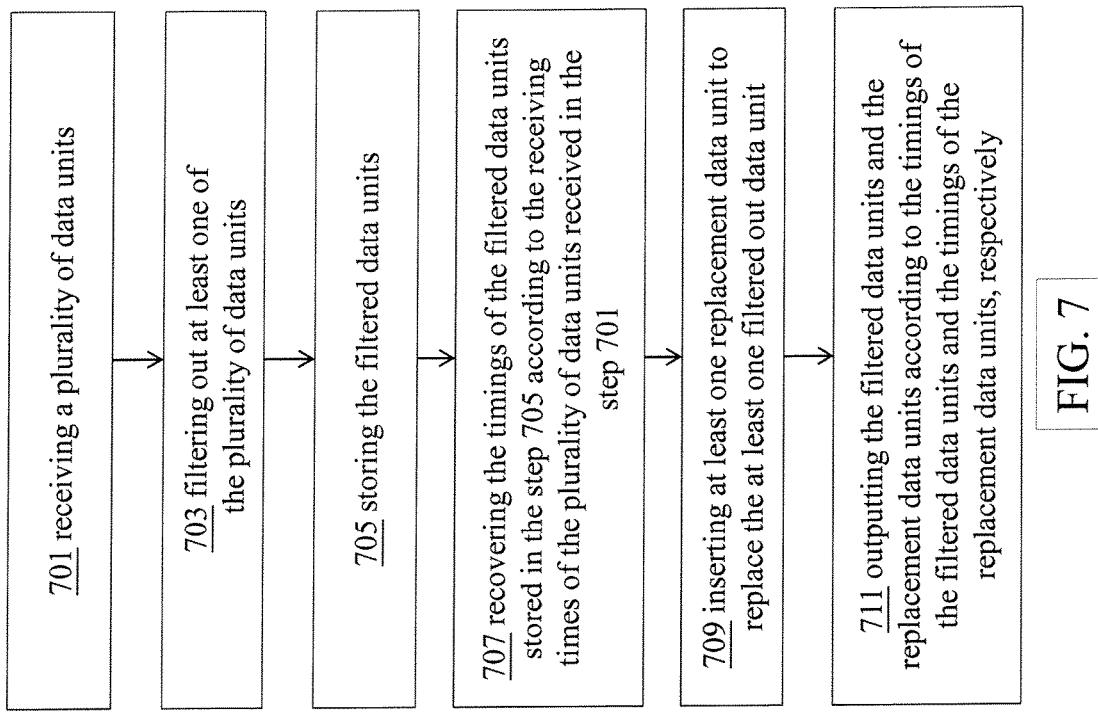
FIG. 7 depicts a flowchart diagram of data access control method according to an embodiment of the present invention.

According to the fore-mentioned embodiments, the data access control method shown in the FIG. 7 is concluded. It comprises the following steps:

Step 701: receiving a plurality of data units (e.g., the original TV data $SD_{in}$ shown in the FIG. 3.)

Step 703: filtering out at least one of the plurality of data units to generate filtered TV data FSD shown in the FIG. 3.

Step 705: storing un-filtered data units.

Step 707: recovering the timings of the filtered data units stored in the step 705 according to the receiving times of the plurality of data units received in the step 701 in order to generate the filtered TV data with timing data TFSD.

Step 709: inserting at least one replacement data unit to replace the at least one filtered out data unit in order to generate filtered TV data with null packets NFSD. Each of the replacement data unit has the same timing of the corresponding filtered out data unit.

Step 711: outputting the filtered data units and the replacement data units according to the timings of the filtered data units and the timings of the replacement data units, respectively. For example, the stored TV data $SD_o$ as shown in the FIG. 3 is outputted.

Other detail steps are already disclosed in the fore-mentioned embodiments. No further discussions are included here.

As discussions in the fore-mentioned embodiments, by inserting null packets, the TV data can be outputted according to original timings. Therefore user experience of watching stored TV data is as the same fluency, smooth, and quality as watching real-time TV program. By adjusting the outputting data rate, user gets better experiences of fluency and smooth media play and image quality.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:
1. A data access control method, comprising:
    (a) receiving a plurality of data units consisting essentially of filtered data units and un-filtered data units, the plurality of data units being part of a single stream of data units having timings with respect to each other;
    (b) dropping the filtered data units;

(c) storing the un-filtered data units;
(d) recovering the timings of the un-filtered data units stored in the step (c) according to the timings of the data units received in the step (a);
(e) reconstituting the single stream of data units by inserting replacement data units to replace the filtered data units, wherein each of the replacement data units has a same timing as each of the filtered data units, respectively; and
(f) outputting the un-filtered data units and the replacement data units as a reconstituted single stream of data units according to the timings of the un-filtered data units and the timings of the replacement data units,
wherein the filtered data units correspond to data units containing content of a first program and the un-filtered data units correspond to data units containing content of a second program, and wherein the first program is not to be viewed and the second program is to be viewed.

2. The data access control method of claim 1, wherein the data units are packets and the replacement data units are null packets.

3. The data access control method of claim 1, wherein the step (e) further comprises:
storing temporarily the un-filtered data units in a buffer; and
checking the buffer to find the timings of the filtered data units.

4. The data access control method of claim 1, wherein the step (f) further comprises:
controlling the data volume of one of the un-filtered data units and the replacement data units during a predetermined time period as a predetermined value.

5. The data access control method of claim 1, wherein the step (f) further comprises:
dividing one of the un-filtered data units and the replacement data units into a plurality of data sub-units;
outputting the data sub-units, wherein there is a non-outputting time period between the data sub-units; and
controlling the data volume of the data sub-units during a predetermined time period as a predetermined value.

6. The data access control method of claim 1, further comprising:
controlling the data volume of outputting in the step (f) equaling to the data volume of receiving in the step (a) in a predetermined time period.

7. A data access control module comprising:
a filter, configured to receive a plurality of data units consisting essentially of filtered data units and un-filtered data units and to drop the filtered data units, the plurality of data units being part of a single stream of data units having timings with respect to each other;
a timing record unit, configured to generate the timings of the data units outputted by the filter according to the timings of the plurality of data units;
a storage unit, configured to store the un-filtered data units;
a timing recovery unit, configured to recover the timings of the un-filtered data units stored in the storage unit according to the timings recorded by the timing record unit;
a replacement data unit insertion unit, configured to reconstitute the single stream of data units by inserting replacement data units to replace the filtered data units, wherein each of the replacement data units has a timing corresponding to a timing of each of the filtered data units, respectively; and
an output controller, configured to output the un-filtered data units and the replacement data units as a reconstituted single stream of data according to the timings of the filtered data units and the timing of the replacement data unit, respectively,
wherein the filtered data units correspond to data units containing content of a first program and the un-filtered data units correspond to data units containing content of a second program, and wherein the first program is not to be viewed and the second program is to be viewed.

8. The data access control module of claim 7, wherein the data unit is a packet and the replacement data unit is a null packet.

9. The data access control module of claim 8, further comprises:
a buffer, configured to store the un-filtered data units; and
a processing unit, configured to control the replacement data unit insertion unit to insert the replacement data units to the buffer.

10. The data access control module of claim 7, further comprising a processing unit, wherein the processing unit controls the output controller such that the outputted data volume of one of the un-filtered data units and the replacement data units during a predetermined time period equals to a predetermined value.

11. The data access control module of claim 7, further comprising a processing unit, wherein the processing unit divides one of the un-filtered data units and the replacement data units into a plurality of data sub-units and controls the output controller such that the outputted data volume of the data sub-units during a predetermined time period as a predetermined value, wherein there is a non-outputting time period between the data sub-units.

12. The data access control module of claim 7, further comprising a processing unit, wherein the processing unit controls the output controller such that the outputted data volume in a predetermined time period equals to the data volume received by the filter in the predetermined time period.

* * * * *